B. W. KING.
AUTOMATIC LOCATING AND DISPLACING MECHANISM.
APPLICATION FILED FEB. 3, 1916.
1,408,096.
Patented Feb. 28, 1922.
3 SHEETS—SHEET 1.
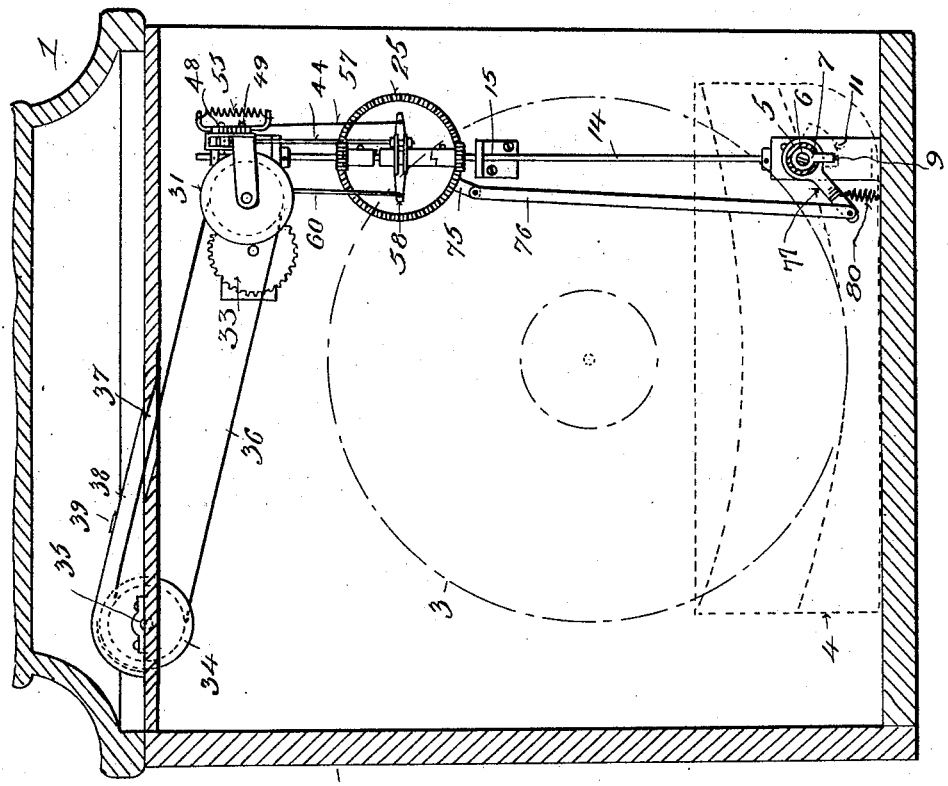
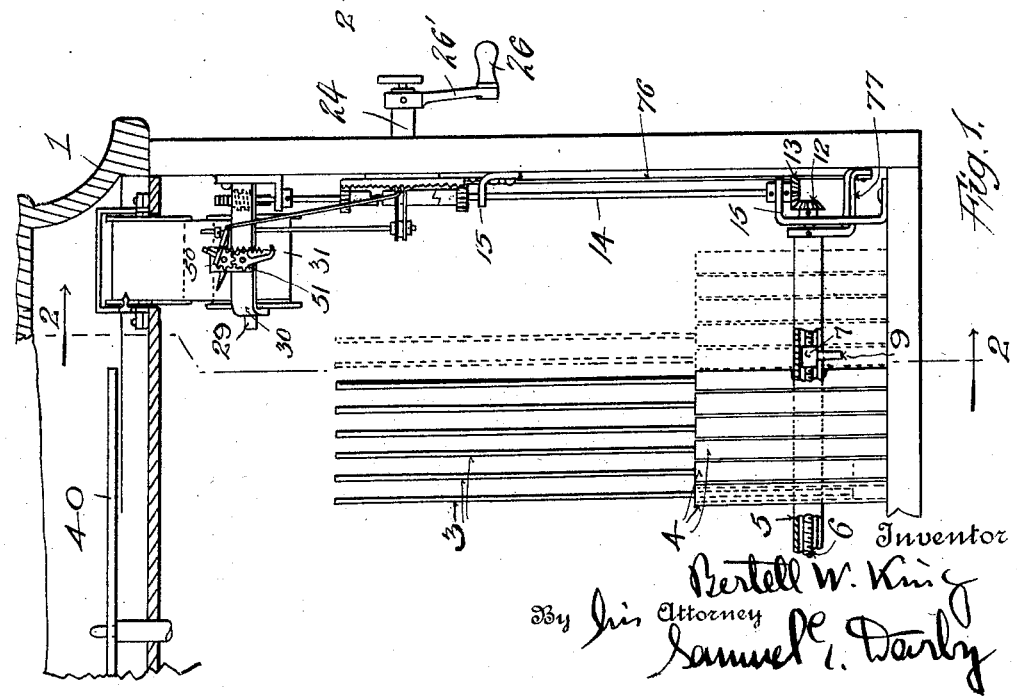
Inventor
Bertell W. King
By his Attorney
Samuel E. Darby

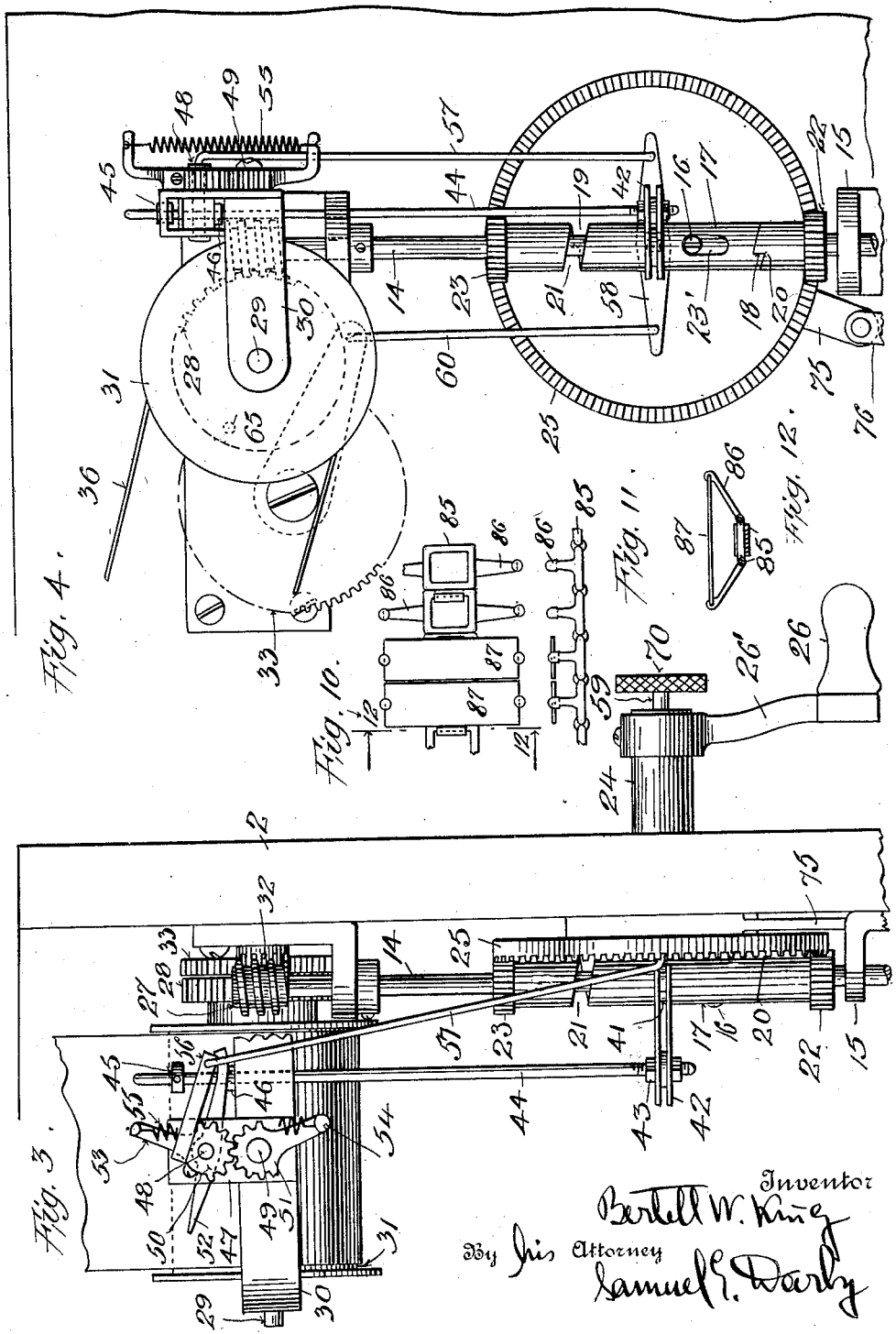

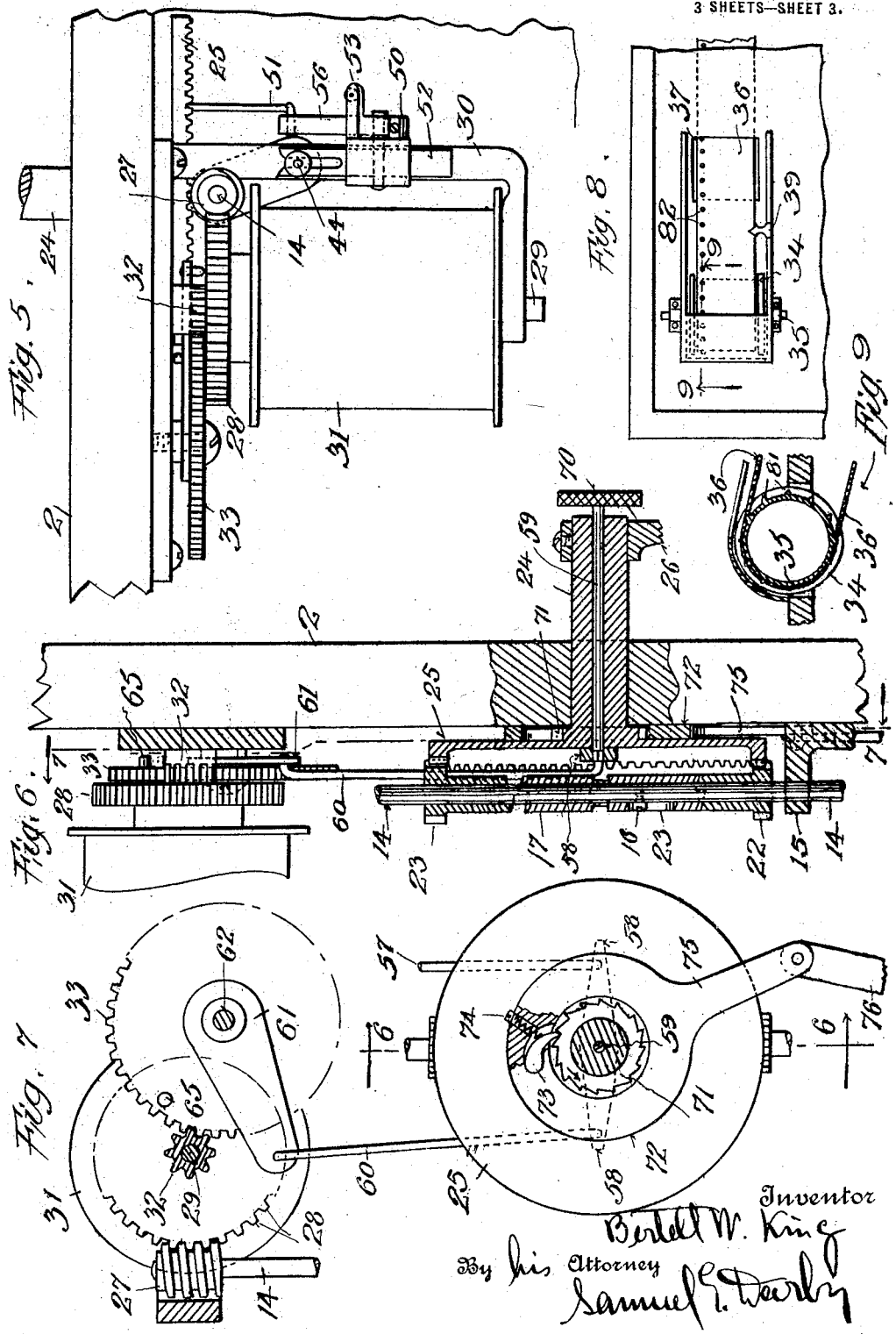

UNITED STATES PATENT OFFICE.

BERTELL W. KING, OF NEW YORK, N. Y.

AUTOMATIC LOCATING AND DISPLACING MECHANISM.

1,408,096.  Specification of Letters Patent.  Patented Feb. 28, 1922.

Application filed February 3, 1916. Serial No. 76,026.

*To all whom it may concern:*

Be it known that I, BERTELL W. KING, a citizen of the United States, residing at New York, in the county of Kings, State of New York, have made a certain new and useful invention in Automatic Locating and Displacing Mechanism, of which the following is a specification.

This invention relates to automatic locating and displacing mechanism.

The object of the invention is to provide an automatic locating and displacing mechanism which is simple in structure, efficient in operation, and economical to manufacture.

A further object of the invention is to provide a device of the class described, which is especially adapted for use in connection with a cabinet as employed with the modern victrola or graphophone.

A further object of the invention is to provide apparatus of the class described having incorporated therein various improvements in the structure for the same purpose disclosed and described in my co-pending application Serial No. 64,153, filed Nov. 29, 1915, patented January 21, 1919, as Number 1,291,924.

Further objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawings, and to several views appearing thereon,

Fig. 1 is a front view, partly sectional, of a portion of a victrola cabinet and embodying my invention.

Fig. 2 is a view in longitudinal section taken on the line 2, 2, Fig. 1, and looking in the direction of the arrows.

Fig. 3 is an enlarged detail front view of a portion of the mechanism shown in Fig. 1.

Fig. 4 is a side view of the same.

Fig. 5 is a top plan view of the same.

Fig. 6 is a side view partly sectional on the line 6, 6, Fig. 7, to show the construction of the crank as used in connection with and embodying the principles of my invention.

Fig. 7 is a sectional view taken on the line 7, 7, Fig. 6, and looking in the direction of the arrows.

Fig. 8 is a top plan view of the interior of the structure shown in Fig. 2.

Fig. 9 is a sectional view taken on the line 9, 9, Fig. 8, and looking in the direction of the arrows.

Fig. 10 is a top plan view of a portion of a modified form of belt used in accordance with my invention.

Fig. 11 is a side view of the same.

Fig. 12 is a sectional view taken on the line 12, 12, Fig. 10, and looking in the direction of the arrows.

The same part is designated by the same reference numeral wherever it occurs throughout the several views.

For the purposes of more clearly illustrating my invention, I have shown my invention as applied to a phonograph or victrola cabinet, but I wish it to be understood that my invention, in its broad scope as defined in the claims is not to be limited or restricted to this specific application of the principles thereof.

In the drawings, reference numeral 1 designates the top of a victrola cabinet 2, of the usual form, in which the respective records 3 are vertically held in closely aligned position with respect to each other in receptacles 4 which are provided with a circular slot through which a tube 5, provided with a longitudinal slot at its bottom extends. A shaft 6 extends through the tube 5, and is suitably journaled in the ends thereof. The shaft 6, is threaded, as shown. and the threads carry a traveler 7 which is provided with a downwardly extending lug 9 which projects through the slot in the tube 5, and is adapted to pass upon its travel along the shaft 6, due to the rotation of said shaft and the threads thereon, through a flanged cut or raceway 11 in the receptacles 4. Thus it will be seen that when the lug 9 of the traveler 7 rests opposite to or in the cut 11 of a receptacle 4, and the tube 5 is rotated clockwise in Fig. 2, the lug comes in contact with the end of the cut 11 and rocks the receptacle and thereby displaces outwardly the record contained therein.

The shaft 6 is provided with a gear 12, which meshes with a similar gear 13 of vertical shaft 14, held in suitable brackets 15, secured to the cabinet body 2.

The structure hereinbefore described is identical in form and operation with that shown in my co-pending application above identified.

Mounted around and secured against rotation on the shaft 14 by means of the screw 16 is a tubular sleeve member 17, provided with a cut away portion 18, 19, at its respective ends to effectively form ratchet driving devices which are adapted to be engaged by similar cutaway portions 20, 21, of gear members 22, 23, respectively loosely mounted on the shaft as shown in Figs. 3 and 4. The tubular member 17 although keyed to the shaft 14 to rotate therewith by means of the screw 16, is adapted to move longitudinally along the shaft 14, by means of the slot 23, through which the screw 16 passes, to be engaged by the ratchet device of either of the gears 22, or 23, it being evident that the member 17 can not at any time be engaged by both of the driving gears 22, 23, at the same time.

A shaft 24, extends through the wall of the cabinet 2, and has secured thereto or cast integral therewith a gear wheel 25, which meshes with and drives both of the gears 22, 23, as shown. The shaft 24, may be rotated in any suitable manner, for instance, by the crank 26' secured thereto. Thus it will be seen that when the parts above described are in the position shown in Figs. 3, 4, and 6, upon the rotation of the crank handle 26, the gear wheel 25, will rotate, say counter clockwise (Fig. 4) thereby rotating the gear member 23, towards the right and the gear member 22, towards the left. As the gear member 22 is in driving relation with the sleeve 17, the sleeve and consequently the shaft 14 is rotated towards the left. When the sleeve 17 is moved longitudinally upwards on the shaft 14, by means to be hereinafter described, the gear member 22, ceases to be in driving relation to the sleeve 17 and the gear member 23 comes in driving relation therewith, thereby causing the shaft 14 to reverse its direction of rotation. It will be seen, therefore, that the direction of rotation of the threaded shaft 6, and consequently the direction of travel of the traveler 7 is accordingly controlled through the gears 12 and 13.

The upper end of the shaft 14 terminates in a worm 27 which meshes with and drives a gear wheel 28, mounted on shaft 29, journaled in a suitable bracket 30, secured to the wall of the cabinet 2. Also mounted on the shaft 29, to rotate therewith, and on the respective sides of the gear wheel 28, is a roller 31, and a relatively small gear wheel 32, which gear wheel meshes with and drives a relatively large gear wheel 33. The relative sizes of the respective gears hereinbefore described is controlled by the factor of the length of the threaded shaft 6, so that the gear wheel 33, makes approximately one revolution when the traveler 7 has traversed the entire length of the shaft 6. Thus it will be seen that by a positive rotation of the crank handle 26, the traveler 7 will be caused to travel the entire length of the shaft 6, while the roller 31 will rotate in accordance therewith, and the gear wheel 33 will make approximately one revolution.

Suitably secured to the cabinet 2, and preferably on the top thereof, within the cover 1, is a roller 34, suitably journaled in bearings 35. An endless belt or tape 36 passes over both of the rollers 31, 34, as shown in Fig. 2, and passes through a slot 37 in the top of the cabinet 2, as shown, so that a portion of the belt can be seen through a glass covering 38 partially shown in said figure, and that as the roller 31 is rotated, the belt 36 will move past an arrow or fixed point 39, carried by the covering 38 as shown in Figs. 2 and 8. It will be noticed that, in the form shown, when applied to a phonograph or victrola cabinet, the rollers 31 and 34, and particularly the roller 34, are at the side of the machine as shown in Figs. 1 and 8, and do not in any way interfere with the record 40 which is rotated by the usual graphophone machine in the usual manner. Thus it will be seen that as the movement of the belt past a fixed point is secured by the same source of power that secures the movement of the traveler 7, the relative movement of each is secured. Therefore by suitably numbering the receivers or receptacles 4 successively in accordance with the relative position of the traveler and likewise numbering or naming the successive portions of the belt 36 lying under the fixed point or arrow, when the belt is moved so that any particular number thereon appears under the index arrow 39, the traveler 7 will be located in the correspondingly numbered receptacle.

It is among the special purposes of my present invention to automatically reverse the direction of rotation of the shaft 6, when the traveler traveling in one direction thereon, reaches the end thereof, and to similarly reverse the direction of travel of the belt 36, by reversing the direction of rotation of the roller 31, all without reversing the direction of positive rotation of the crank handle 26. I accomplish this result by merely reversing the direction of rotation of the shaft 14, by suitably shifting the sleeve 17, into and out of engaging relation with the driving gears 22, 23, respectively in the following manner. The sleeve 17 is provided with a groove 41, in which rests a forked member 42, preferably composed of two strips of spring steel. Adjustably lengthwise with respect to the forked members 41 and secured thereto by means of nuts 43, is a vertical shaft 44, which extends through the bracket 30, as shown, and is provided at its end which projects through the bracket 30, with two collars 45, 46. Mounted on each side of the bracket 30, are vertical plates 47, which form bearings for shafts 48, 49, on which are mounted gear segments 50, 51, respectively which mesh with each other, as shown. Also mounted on shaft 48, is a lever 52, which is forked at one end to engage the shaft 44, between the collars 45, 46, so that when the lever 52, is rocked in one direction the shaft 44, will be forced downward, and when rocked in the other direction will be forced upward, thereby controlling the upward and downward movement of the sleeve 17, and thus controlling the direction of rotation of the shaft 14, and consequently the direction of travel of the traveler 7. The shafts 48, 49, of the segments 50, 51, are in vertical alignment, and each of the segments is provided with an arm 53, 54, respectively, which is out of alignment with the vertical alignment of the shafts 48, 49, in their two respective limits of movement as controlled by the lever 52, and the upper surface of the bracket 30, which the ends of the lever are adapted to bear against at the limit of its rocking movement. A tension spring 55 connected together the ends of the arms 53, 54, to hold the segments positively in their respective limits of movement whether to the right of shafts 48, 49, as shown in Fig. 3, or to the left thereof.

The upper segment 50 has also an arm 56, arranged preferably at right angles to the vertical arm 53. To the end of this arm is connected one end of a rod 57, the other end of which is connected to one end of a lever 58, which is carried at its center by a shaft 59, see Fig. 6, which extends through the shaft 24, and through the center of the gear wheel 25, for movement independent thereof. The other end of the lever 58 is connected to one end of a rod 60, the other end of which is secured to a lever 61 which is loosely mounted on shaft 62, of the gear wheel 33, as clearly shown in Fig. 7. Thus it will be seen that when the lever 61 pulls the rod 60, upwards, thereby rocking the lever 58, the rod 57 is pulled downwards thereby rocking the segments to the position shown in Fig. 3, the lever 52, thereby forcing the rod 44 and consequently the sleeve 17, downwardly making driving engagement between the sleeve and the gear 22, and, upon the positive rotation of the crank handle 26, and gear wheel 25, cause the shaft 14 to rotate towards the left and thereby causing the traveler 7 to travel towards the right or left on the shaft 6, according to the direction of the threads thereon. Likewise, to secure the reversal of direction of travel of the traveler upon the shaft 6, the lever 61 is pushed downwardly, thereby rocking the lever 58, pushing upwardly the rod 57, consequently rocking the lever 52, the forked end of which forces the rod 44 upwards thereby pulling the sleeve 17 out of engaging relation with the gear 22, and into engaging relation with the gear 23.

To secure the automatic reversal of rotation of the shaft 14 when the traveler 7 reaches either end of the shaft 6, I provide a pin 65, on the surface of the gear wheel 33, as shown in dotted lines in Fig. 4 and in full lines in Fig. 7. As has been hereinbefore explained, the gear wheel 33, makes approximately one revolution while the traveler travels from one end of the shaft 6 to the other. Therefore, when the traveler reaches one end of travel on the shaft, the pin 65 will bear against and force downward the lever 61, and upon the end of travel of the traveler upon the shaft 6 in the other direction, the pin 65 will bear against the lever 61 and force the same upwards.

It will be understood, that in sliding the sleeve 17 upwards or downwards, as the case may be, it is detached from the driving gear with which it was in engagement and clutches with the other driving gear, therefore, even though the crank handle 26 is turned during the upward or downward movement of the sleeve, the traveler and the rollers are stationary and consequently the relative position of the belt to the fixed arrow and to the corresponding receptacles is not disarranged, while at the same time, the spring members 42, and the spring 55, of the segments, prevent the device from striking dead center and locking the apparatus.

Thus it will be seen that when an operator desires to secure a record corresponding to a number or name appearing on the belt, the handle 26 is turned positively until the number or name appears under the indicator 39, consequently the traveler will be lying in the groove of the receptacle corresponding to the number or name on the belt.

It may frequently happen that through inadvertence or for any reason, the traveler is moved in one direction past the particular record desired, as shown on the belt it is therefore desirable to be able to quickly reverse the direction of travel of the traveler without necessitating the positive rotation of the handle until the traveler reaches the end of the shaft 6, and the pin 65 on gear wheel 33, automatically reverses the same, as has been hereinbefore described, thereby also necessitating the travel of the traveler all the way back to the desired record. For this purpose, I extend the shaft 59 through the end of the shaft 24, and mount thereon a thumb piece 70 as shown in Fig. 6, so that the shaft 59 and consequently the lever 58 may be rocked when desired, and independently of the automatic mechanism hereinbefore described.

After the desired record receptacle has been located, it is desirable to secure the easy and quick displacement thereof. For this purpose I employ the following arrangement. It will be noted that upon the positive rotation of gear wheel 25, the sleeve 17 will be engaged with and driven by either the gear 22, or the gear 23. But, however, upon the reversal of rotation of the crank 26 and the gear wheel 25, the sleeve becomes disengaged from the driving gear 22, or 23, as the case may be, due to driving connections 18 and 20, which prevent the actuation of shaft 14. I therefore mount a ratchet wheel 71 on the shaft 24, to rotate therewith, and also loosely mount a collar 72 upon the shaft 24, about, but out of contact with, the ratchet wheel 71, as clearly shown in Figs. 6 and 7. Mounted in the collar 72, to bear against the ratchet is a pawl 73, normally held against the ratchet wheel 71 by a spring 74. Upon the positive rotation of the shaft 24, the ratchet wheel slips by the pawl 73, as will be readily understood. When the direction of rotation of the shaft 24 is reversed, however, the pawl engages the ratchet wheel 71, and thereby causes the entire collar 72 to rotate counter-clockwise in Fig. 7. The collar 72 is provided with an arm 75, which is pivotally connected to one end of a rod 76, the other end of which is connected to a lever 77 cast integral with or secured to the tube 5. Thus it will be seen that the reversal of rotation of the crank 26 without affecting the belt 36 or the traveler 7, rocks the tube 5, thereby causing the lug 9 of the traveler to rock the receptacle 4, in which it happens to be, thereby displacing the receptacle and desired record. A spring 80, attached to the lever 77, and the bottom of the cabinet returns the lever 77 to its normal position, and replaces the parts described in their normal operative condition, as soon as the handle 26 is released, or is rotated again in its positive direction of rotation.

If desired, and as shown in Figs. 8 and 9, one or both of the rollers 31, 34, may be provided with teeth 81 adapted to engage perforations 82, on the belt 36 to prevent slipping thereof.

In Figs. 10, 11 and 12, I show a chain arrangement that may be employed in place of the belt 36 hereinbefore described, which may be operated over sprockets instead of the rollers 31, 35. In this arrangement I prefer to form the chains 85 with slanting vertical arms 86, on each side thereof, and cards bearing the name or number or both, indicated at 87, may be secured between the arms 86 of the chain.

Many modifications will occur to those skilled in the art without departing from the broad scope of my invention, I therefore wish it to be understood that my broad invention, as defined in the claims, is not to be limited to the specific arrangement shown and described.

Having now set forth the objects and nature of my invention, what I claim as new and of my own invention and desire to secure by Letters Patent, is,—

1. In a device of the class described, the combination of an endless belt, a traveler, rotative operating means for coincidently moving said belt and said traveler, and means for automatically reversing the direction of rotation of said belt when said traveler reaches the limit of its travel, and means actuated by a reversal of direction of said rotative source of power for rocking said traveler.

2. In a device of the class described, the combination of an endless belt, a traveler, means for coincidently moving said belt and said traveler, and means for automatically reversing the direction of rotation of said belt, when said traveler reaches the limit of its travel, and means for rocking said traveler.

3. In a device of the class described, the combination of an endless belt, means for operating the same, a gear wheel actuated by said belt operating means, a reversing device, and means located on said gear wheel to actuate said reversing device when said gear wheel makes substantially one revolution.

4. In a device of the class described, the combination of an endless belt, means for operating the same, a gear wheel actuated by said belt operating means, a lever loosely mounted on the shaft of said gear wheel, and forming part of a reversing device, and a pin located on said gear wheel and adapted to operate said lever upon the completion of one revolution of said gear wheel in either direction.

5. In a device of the class described, the combination of an endless belt, a traveler, means including a crank handle for coincidently operating said belt and traveler, and means controlled by the operation of first mentioned means for reversing the direction of rotation of said belt without reversing the direction of rotation of said crank handle and means controlled by reversing the direction of rotation of said handle for rocking said traveler.

6. In a device of the class described, the combination of an endless belt, a traveler, means including a crank handle for coincidently operating said belt and traveler, a reversing device, and means operated by the said first mentioned means for actuating said reversing device without reversing the direction of rotation of said crank handle, and means controlled by reversing the direction of rotation of said handle for rocking said traveler.

7. In a device of the class described, a shaft, a threaded shaft associated therewith and adapted to be rotated thereby, a traveler mounted on said threaded shaft to travel therealong, rotary means for rotating said first mentioned shaft and means actuated by the reversal of rotation of said rotary means for rocking said traveler about said threaded shaft.

8. In a device of the class described, a shaft, rotary means for rotating said shaft, a threaded shaft geared to said shaft, a tube surrounding said threaded shaft and provided with a longitudinal slot at the bottom thereof, a traveler mounted on said threaded shaft and provided with a downwardly projecting lug extending through the slot of said tube, and means operated by the reversal of rotation of said rotary means for rocking said tube.

9. In a device of the class described, a shaft, a crank handle attached thereto, a collar loosely mounted thereon and means to rock said collar by reversing the direction of rotation of said shaft.

10. In a device of the class described, a shaft, a threaded shaft associated therewith and adapted to be rotated thereby, a traveler mounted on said threaded shaft to travel therealong, rotary means for rotating said first mentioned shaft and means actuated by the reversal of rotation of said rotary means for rocking said traveler about said threaded shaft, and means to return said traveler to its normal position.

11. In a device of the class described, a shaft, rotary means for rotating said shaft, a threaded shaft geared to said shaft, a tube surrounding said threaded shaft and provided with a longitudinal slot at the bottom thereof, a traveler mounted on said threaded shaft and provided with a downwardly projecting lug extending through the slot of said tube, means operated by the reversal of rotation of said rotary means for rocking said tube, and means to return said tube to its normal position.

12. In a device of the class described, a shaft, rotary means for rotating said shaft a threaded shaft geared to said shaft, a tube surrounding said threaded shaft and provided with a longitudinal slot at the bottom thereof, a traveler mounted on said threaded shaft and provided with a downwardly projecting lug extending through the slot of said tube, connections between said rotary means and said tube for rocking said tube upon the reversal of rotation of said rotary means, and means secured to said connections for returning said tube to its normal position.

In testimony whereof I have hereunto set my hand on this 25th day of January A. D., 1916.

BERTELL W. KING.